United States Patent [19]

Gerber

[11] Patent Number: 5,613,593
[45] Date of Patent: Mar. 25, 1997

[54] CONTAINER HANDLING STARWHEEL

[75] Inventor: Stephen M. Gerber, Petersburg, Mich.

[73] Assignee: Owens-Brockway Glass Container Inc., Toledo, Ohio

[21] Appl. No.: 344,592

[22] Filed: Nov. 18, 1994

[51] Int. Cl.$^6$ .................................................. B65G 29/00
[52] U.S. Cl. ........................ 198/479.1; 198/377; 198/384
[58] Field of Search .................................. 198/377, 384, 198/470.1, 479.1; 209/524, 538

[56] References Cited

U.S. PATENT DOCUMENTS

| | | | |
|---|---|---|---|
| 3,410,388 | 11/1968 | Hendrickson et al. | |
| 3,772,922 | 11/1973 | Riggs . | |
| 3,783,992 | 1/1974 | Cook | 198/377 |
| 4,428,474 | 1/1984 | Gau et al. | 198/377 |
| 4,467,847 | 4/1984 | Zdorow . | |
| 4,511,025 | 4/1985 | Nakayama . | |
| 4,629,389 | 12/1986 | Kontz | 198/377 |
| 4,830,169 | 5/1989 | Nariki et al. | |
| 4,947,716 | 12/1990 | Yuri et al. | |

*Primary Examiner*—Joseph E. Valenza

[57] ABSTRACT

A starwheel (10) for serially moving a circumferentially spaced apart series of containers (C) in an arcuate pattern with respect to a stationary container supporting member (12). The starwheel has a turret (58), which is driven about its circumferential axis in an indexing manner by a motor and speed reducer combination (8). Each container is positively restrained during its movement with the supporting member by engagement of the container against a pair of idler rollers (14, 16) by a flight of an endless belt (24), which engages the container at a location generally opposed to the locations of its engagement by the idler rollers. The belt is moved through an endless path during the indexing of the starwheel, and during the intervals between its indexing steps, to thereby rotate the container during indexing and during its inspection or other processing steps, by training the belt around a driven roller (34). The driven roller is driven by the engagement of a driven gear (36), to which the driven roller is attached by a shaft (38), with a driving gear (40) that is rotatably driven by a motor (60). The belt is also trained around a second set of roller idler rollers (26, 28) that are mounted at the free ends of lever arms (30, 32). The lever arms are pivotally connected to each other at an axis away from the locations of the second set of idler rollers. The belt is moved toward the first set of idler rollers to engage a container thereagainst, and away from the first set of idler rollers to permit disengagement of a container therefrom, by the engagement of a cam follower (44) with a cam surface of a stationary circumferential fixed cam (46). The motion imparted to the cam follower is transmitted to one of the lever arms to which the second set of idler rollers is attached by a rod (42), an end of which is attached to the lever arm and the opposed end of which carries the cam follower.

11 Claims, 4 Drawing Sheets

CONTAINER HANDLING STARWHEEL

FIELD OF THE INVENTION

This invention relates to a container handling device, of a type which is commonly referred to as a starwheel, for sequentially advancing bottles or other containers along an arcuate path past one or more stations where inspection or other processing steps are performed on the containers.

BACKGROUND OF THE INVENTION

In the manufacture of glass bottles and other types of containers it is known that various processing steps, for example, electronic inspection steps, can be performed sequentially at spaced apart stations, and that the containers can be sequentially advanced from station to station by a device, which is commonly referred to as a starwheel, that slides the containers across a plane in a part circular path. A starwheel is a device that rotates in a horizontal plane, and it heretofore has had a series of semi-circular or arcuate pockets in its periphery, each such pocket being adapted to receive one container therein. Containers are advanced to a first position of the starwheel in a single file by a worm gear or other handling device, and are removed from the starwheel at a second position by another worm gear or other handling device. The containers are advanced from the first position to the second position by the movement of the starwheel about its vertical central axis, typically in an indexing movement pattern in which the starwheel moves in a series of short arcuate steps.

In a typical prior art starwheel of the type described, there will be some clearance between each container and the starwheel pocket in which it is positioned. This clearance requirement causes such starwheels to be rather noisy, and it can lead to decentering or misalignment of the containers with respect to the inspection devices or other processing devices which are positioned to perform inspection or processing steps on the containers at various stations along the arcuate path travelled by the starwheel. The requirement for recentering or realigning of containers at each processing station delays the start of the processing step that is performed at such station, thus limiting the throughput of the processing line. Further, since a given starwheel is usually used to process containers of different sizes, it is usually necessary to supply each starwheel with change parts to be assembled to or removed from the starwheel to thereby increase or decrease the size of the container receiving recesses in the starwheel when it is desired to begin the processing of containers of a greater or lesser size, and this requirement adds to the cost of the starwheel and to the changeover time required to adapt a starwheel to the processing of containers of a different size.

SUMMARY OF THE INVENTION

In accordance with the present invention there is provided an improved container handling starwheel which overcomes the foregoing and other problems associated with prior art starwheels. A starwheel according to the present invention includes, at each container engaging location around its periphery, a spaced apart pair of idler rollers, which engage the exterior of container at spaced apart locations, and an endless belt, which engages the exterior of the container at a location between the locations of the idler rollers. The belt, thus, positively restrains the container during the indexing motion, and thereby ensures that the container will be properly centered when it reaches its next processing station. Further, the endless belt is caused to move in an endless path with respect to the container that it engages, further ensuring that the container will be remain properly centered with respect to the idler rollers of the starwheel.

Accordingly, it is an object of the present invention to provide an improved container handling starwheel. More particularly, it is an object of the present invention to provide a container handling starwheel which positively centers each container during its advance along an arcuate path by the starwheel. It is also an object of the present invention to provide a container handling starwheel that operates at lower noise levels than prior art starwheels. It is also an object of the present invention to provide a container handling starwheel that can accommodate containers of various sizes without requiring the addition to or removal from the starwheel of change parts for each such container size.

For a further understanding of the present invention and the objects thereof, attention is directed to the drawing and to following brief description thereof, to the detailed description of the preferred embodiment and to the appended claims.

DETAILED DESCRIPTION OF THE PREFERRED EMBODIMENT

Figure 2A:
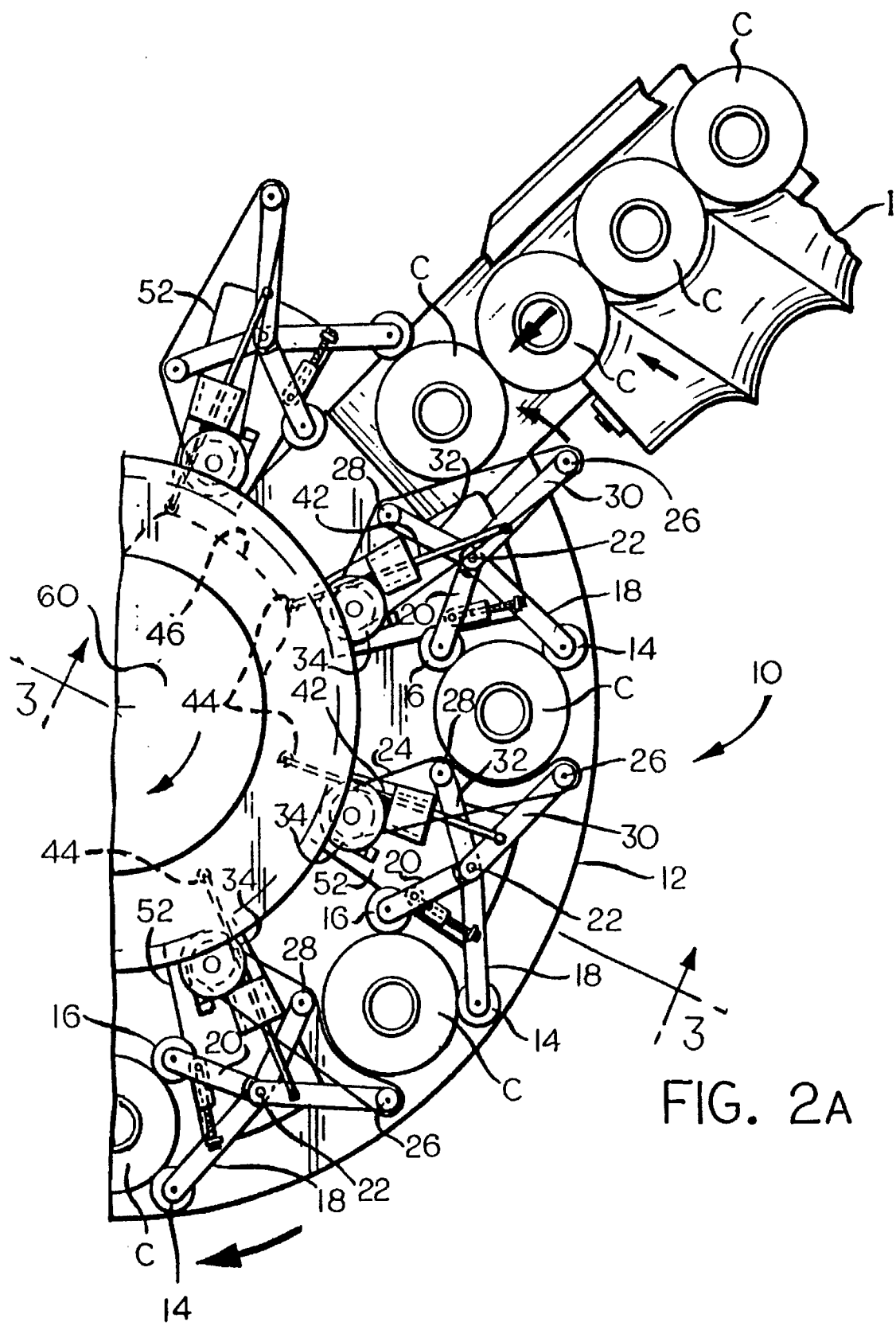
FIG. 2A is an plan view of a portion of the starwheel of FIG. 1.
Figure 2B:
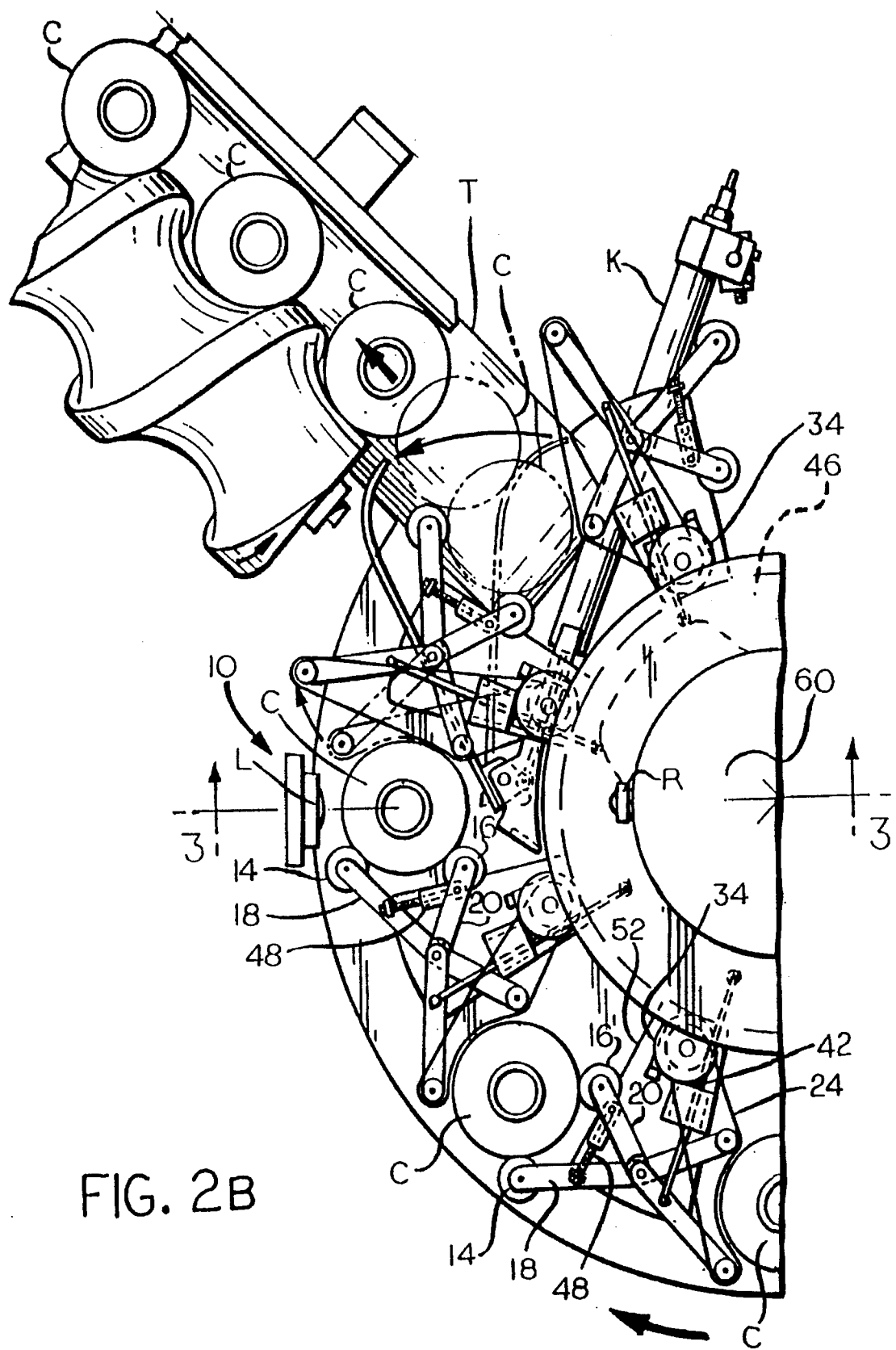
FIG. 2B is a plan view of the other portion of the starwheel of FIG. 1, FIGS. 2A and 2B, when joined, representing a complete plan view of the starwheel of FIG. 1.

A starwheel according to the preferred embodiment of the present invention is indicated generally by reference numeral 10. The starwheel 10 is used in conjunction with a stationary horizontally extending member 12 which is adapted to support a plurality of containers C, such as freshly formed round glass containers, in a circumferentially spaced apart array of such containers C. The containers C are sequentially delivered to the member 12 from an infeed device I, which may be of a rotary worm gear or other conventional construction. As is clear from FIG. 2A, the containers C arrive at the member 12 approximately at the 1:30 o'clock position of the starwheel 10. The starwheel 10 is caused to advance in an incremental or indexing fashion, in a clockwise direction in the arrangement illustrated in the drawing, to advance the containers C in a sliding motion across the member 12 through a series of steps until they arrive at a position in alignment with a takeout device T, which may also be of a rotary worm gear or other conventional construction. As is clear from FIG. 2B, the takeout device T is positioned approximately at the 10:30 o'clock position of the starwheel 10. The transfer of a container C from the starwheel 10 to the takeout device 10 is actuated by a spring-loaded kickout mechanism K, which may be of a conventional construction.

Figure 3:
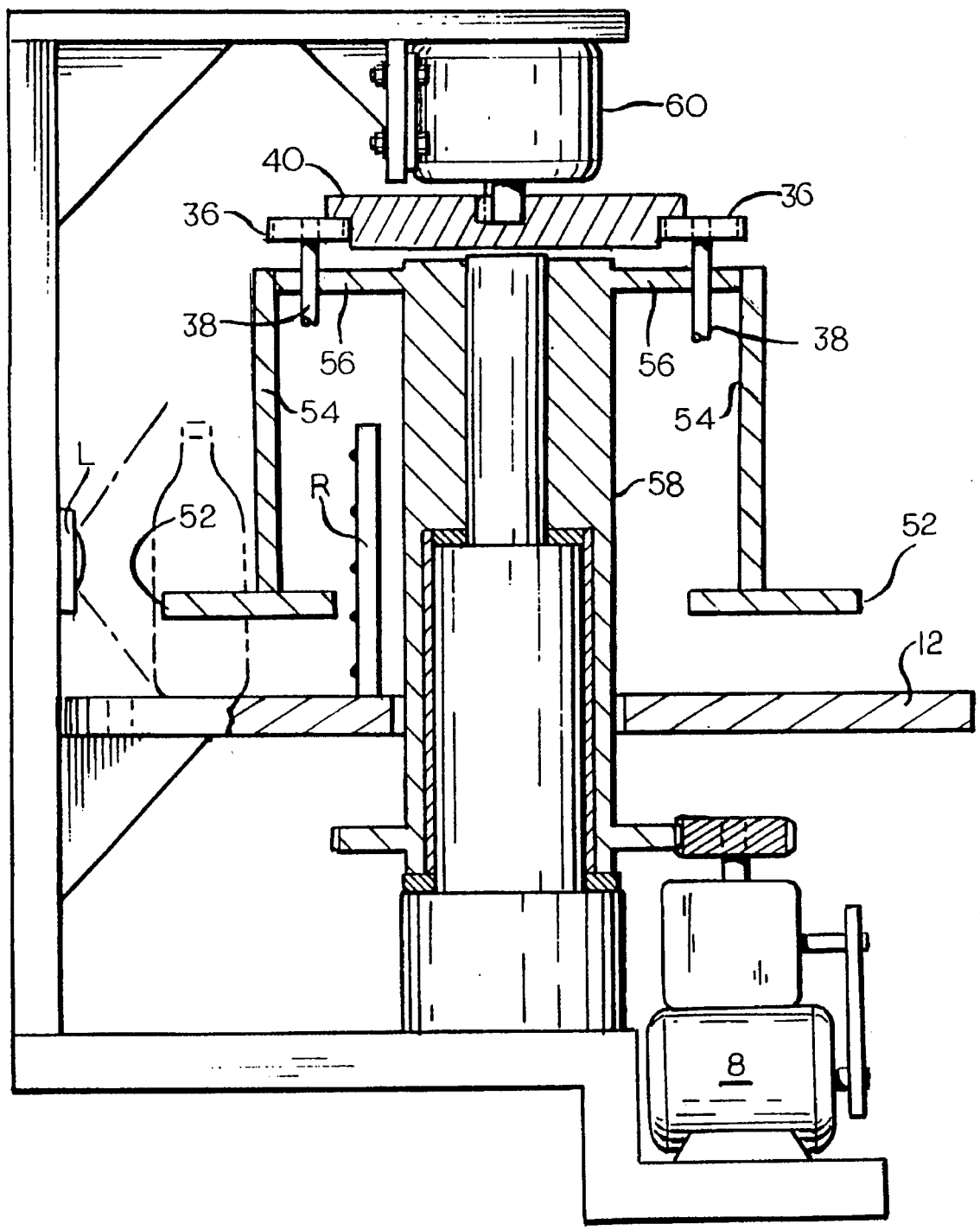
FIG. 3 is a sectional view taken on line 3—3 of FIGS. 2A and 2b.

During the indexing of each container C from the infeed device I to the takeout device T, a vertically extending, rotatable turret 58 of the starwheel 10, which extends along the vertical central axis of the member 12 and is powered by a schematically illustrated motor and speed reducer combination 8, of conventional construction, is successively positioned at a plurality of processing stations. A typical station is illustrated in FIG. 3 and shows a container C being positioned between a light source R and a light receiver L for inspection of the container C for various types of manufacturing defects or flaws. The starwheel 10 is further provided with a plurality of sets of spaced apart idler rollers 14, 16, which are positioned at the ends of lever arms 18, 20, respectively. The lever arms 18, 20 are pivotally joined to each other at an axis 22, which is away from the ends of the arms 18, 20 to which the rollers 14, 16 are attached. The axis 22 is the axis by which the arms 18, 20 are pivotally secured to a radial wing 52 of the starwheel 10, and each radial wing 52 is suspended by a support member 54 from a radial wing 56 of the turret 58. The idler rollers 14, 16 are positioned with their central axes of rotation extending parallel to the vertical central axes of the container C, and each set of idler rollers 14, 16 is positioned to engage a container C at circumferentially spaced apart locations thereof.

Figure 1:
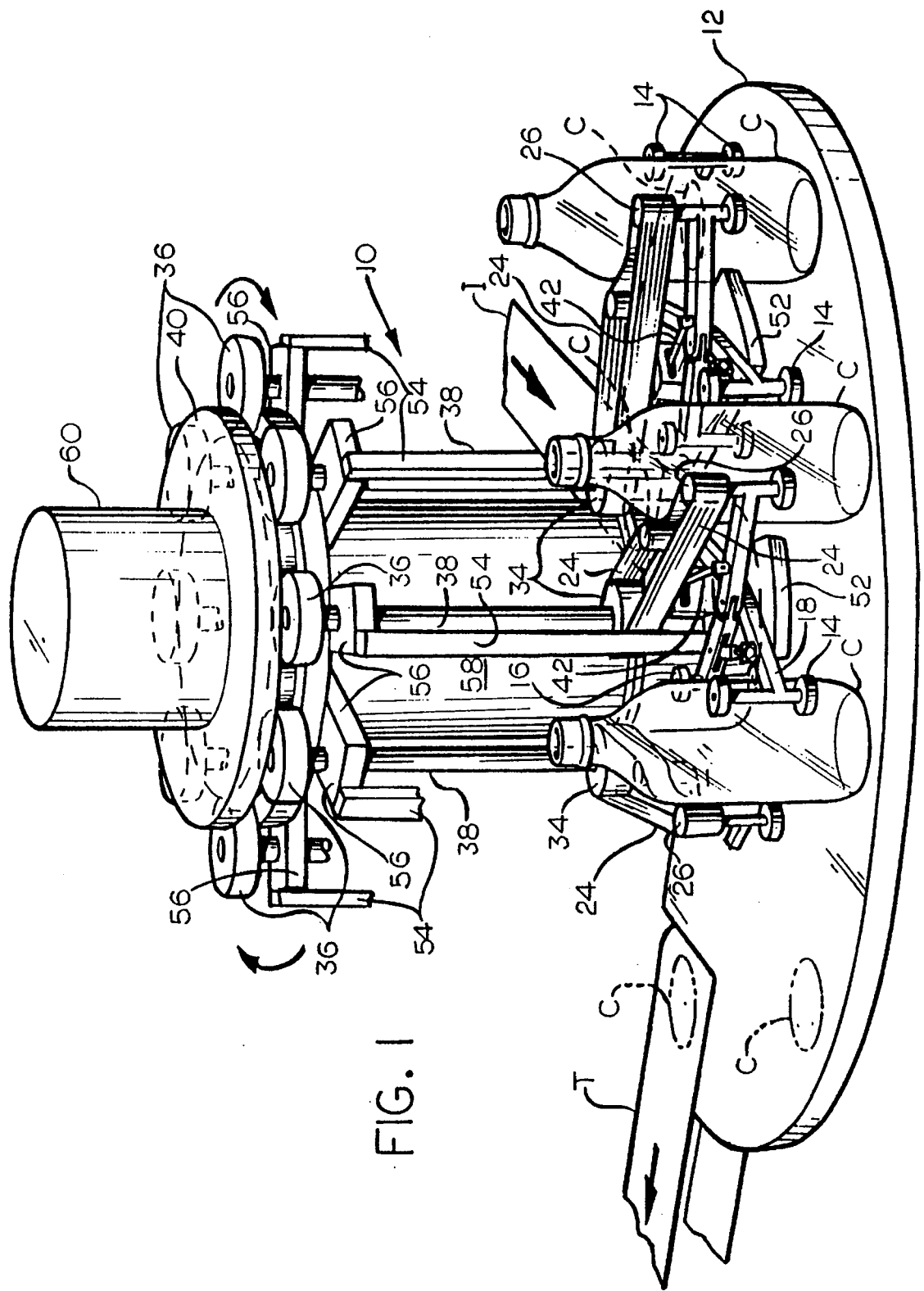
FIG. 1 is a perspective view of a starwheel according to the preferred embodiment of the present invention.

Each container C is snugly held against the set of idler rollers 14, 16 that it is adjacent to by a flight of an endless belt 24, which is the portion of the belt that is adjacent to the container C. The endless belt 24, which engages the container C at a location that is between and generally opposed to the locations where the container C is engaged by the idler rollers 14, 16, is rotatably supported at spaced apart locations by idler roller 26, 28. The rollers 26, 28 are positioned at the ends of lever arms 30, 32, which are also pivotally joined to each other at the axis 22. The belt 24 is also trained around a driven roller 34 and, as is shown in FIG. 1, the driven roller 34 is driven by engagement between a driven gear 36, shown schematically, at the opposite end of a shaft 38 to which the driven roller 34 is secured, and an annular driving gear 40, shown schematically, at the base of a drive motor 60. The rotation of the driving gear 40, thus, imparts rotational motion to each container C both during the indexing motion of the turret 58 and during the periods when the turret 58 is stopped.

Each belt 24 is moved into and out of engagement with a container C that is adjacent to the belt 24 by the selective pivoting of the lever arm 30, to thereby permit a container C to be moved into engagement with the adjacent set of idler rollers 14, 16 and thereafter to permit a container C to be withdrawn from such engagement. The pivoting of each lever arm 30 is actuated by a rod 42, an end of which is pivotally attached to the lever arm 30. An opposed end of each rod 42 carries a cam follower 44, and each cam follower 44 engages a stationary circumferential cam 46, which is coaxial with the turret 58. The cam 46 has a cam surface that is configured to withdraw each belt 24 from engagement with a container C as the container C arrives at the station adjacent the takeout device I and thereafter to bring the belt 24 back into engagement with a new container C, after the new container C is introduced into the starwheel 10 at the station adjacent the infeed device I.

The spacing between the rollers 14, 16 in each set thereof may be adjusted by adjusting the included angle between the lever arms 18, 20, and this permits the starwheel 10 to be modified when it is desired to use it to handle containers C of a greater or lesser diameter than those previously handled. The adjustment in the angular spacing between the lever arms 18, 20 may be done quite simply, and without the need to replace any parts of the starwheel 10, by a nut and bolt assembly 48, opposed ends of which are pivotally attached to the arms 18, 20 between the axis 22 and the idler rollers 14, 16 that are attached to the arms 18, 20, respectively.

Preferably, the lever 18 and lever arm 32 are formed as a unitary element. Thus, any adjustment in the angular spacing between the lever arms 18, 20 will also result in a corresponding change in the angular spacing between the lever arms 30, 32.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims and the legal equivalents thereof.

What is claimed:

1. Apparatus for advancing a plurality of containers, in sequence, from an infeed station to a takeout station, said apparatus comprising:

a generally horizontally extending container supporting means for supporting a plurality of containers;

a generally vertically extending turret, said generally vertically extending turret being positioned generally centrally of said container supporting means;

means for moving said turret in a rotary pattern about a vertical central axis of said turret; and a plurality of circumferentially spaced apart container engaging means carried by said turret and rotatable with said turret for engaging one of the containers, each of said container engaging means comprising;

first container engaging means for engaging a container at a plurality of circumferentially spaced apart locations of the container, second container engaging means for engaging the container at a location circumferentially spaced between the locations where the container is engaged by the first container engaging means and generally opposed thereto, and means for moving one of said first engaging means and said second engaging means toward and away from the other of said first engaging means and said second engaging means for securely engaging the container after the container is received by said container supporting means from the infeed station and for permitting disengagement of the container from said each of said container engaging means at the takeout station.

2. Apparatus for advancing a plurality of containers, in sequence, from an infeed station to a takeout station, said apparatus comprising:

a generally horizontally extending container supporting means for supporting a plurality of containers;

a generally vertically extending turret, said generally vertically extending turret being positioned generally centrally of said container supporting means;

means for moving said turret in a rotary pattern about a vertical central axis of said turret; and a plurality of circumferentially spaced apart container engaging means carried by said turret and rotatable with said turret for engaging one of the containers, each of said container engaging means comprising:

first container engaging means for engaging a container at a plurality of circumferentially spaced apart locations of the container, second container engaging means for engaging the container at a location circumferentially spaced between the locations where the container is engaged by the first container engaging means and generally opposed thereto, and means for moving one of said first engaging means and said second engaging means toward and away from the other of said first engaging means and said second engaging means for securely engaging the container after the container is received by said container supporting means from the infeed station and for permitting disengagement of the container from said each of said container engaging means at the takeout station;

wherein one of said first container engaging means and said second container engaging means comprises a pair of idler rollers and means for mounting each of said pair of idler rollers for rotary movement with said turret about the vertical central axis of said turret and for free rotation of said each of said pair of idler rollers with respect to said turret about a vertical central axis of said each of said pair of idler rollers;

wherein the other of said first container engaging means and said second container engaging means comprises an endless belt and means for mounting said endless belt to position a portion of said endless belt adjacent to the container; and wherein said means for moving comprises means for moving said endless belt toward and away from said pair of idler rollers to engage a container against said pair of idler rollers when said endless belt has been moved toward said pair of idler rollers.

3. Apparatus according to claim 2 and further comprising:

first and second lever arms, each of said pair of idler rollers being rotatably attached to one of said first and second lever arms adjacent a free end thereof, said first and second lever arms being pivotally attached to one another about a pivot axis positioned away from the free end of each of said first and second lever arms, said first and second lever arms defining an included angle therebetween; and adjustable means connected to each of said first and second lever arms at a location between the free end of said each of said first and second lever arms and the pivot axis, the adjustment of said adjustable means changing the included angle, and thereby the spacing between the idler rollers of said pair of idler rollers, for permitting the advancing of containers of various sizes.

4. Apparatus according to claim 2 wherein:

said other of said first container engaging means and said second container engaging means comprises drive means for causing said endless belt to move through an endless path while said supporting member is moving to advance a container from the infeed station to the takeout station to cause the container to turn about its vertical central axis as it is being advanced from the infeed station to the takeout station.

5. Apparatus according to claim 2 wherein said drive means comprises:

a driven roller, said endless belt being trained about said driven roller to be moved through the endless path by rotation of said driven roller;

drive gear means positioned coaxially with said generally vertically extending turret; and driven gear means engageable with said drive gear means for rotating said driven roller as said turret member is moved in a rotary pattern about its vertical central axis and with respect to said driven gear means.

6. Apparatus according to claim 2 wherein:

said other of said first container engaging means and said second container engaging means comprises third and fourth lever arms, a second pair of idler rollers, one of said second pair of idler rollers being rotatably attached to one of said third and fourth lever arms adjacent a free end thereof, the other of said second pair of idler rollers being rotatably attached to the other of said third and fourth lever arms adjacent a free end thereof, said third and fourth lever arms being pivotally attached to one another about a second pivot axis positioned away from the free end of each of said third and fourth lever arms, said third and fourth lever arms defining a second included angle therebetween; and wherein said means for moving comprises means for pivoting one of said third and fourth lever arms with respect to the other of said third and fourth lever arms to change the second included angle therebetween.

7. Apparatus according to claim 6 wherein said means for pivoting comprises:

a rod having an end connected to one of said third and fourth lever arms at a location between the second axis and said free end of said one of said third and fourth lever arms;

a cam follower secured to the other end of said rod;

and a stationary circumferential cam positioned coaxially with said turret, said stationary circumferential cam having a cam surface, said cam surface engaging said cam follower and being configured to move said cam follower and said rod to pivot said one of said third and fourth lever arms with respect to the other of said third and fourth lever arms as said turret moves in a rotary pattern.

8. Apparatus according to claim 7 wherein said second pivot axis is coaxial with said pivot axis and wherein the other of said third and fourth lever arms is formed integrally with one of said first and second lever arms.

9. Apparatus according to claim 5 wherein:

said other of said first container engaging means and said second container engaging means comprises third and fourth lever arms, a second pair of idler rollers, one of said second pair of idler rollers being rotatably attached to one of said third and fourth lever arms adjacent a free end thereof, the other of said second pair of idler rollers being rotatably attached to the other of said third and fourth lever arms adjacent a free end thereof, said third and fourth lever arms being pivotally attached to one another about a second pivot axis positioned away from the free end of each of said third and fourth lever arms, said third and fourth lever arms defining a second included angle therebetween; and wherein said means for moving comprises means for pivoting one of said third and fourth lever arms with respect to the other of said third and fourth lever arms to change the second included angle therebetween.

10. Apparatus according to claim 9 wherein said means for pivoting comprises:

a rod having an end connected to one of said third and fourth lever arms at a location between the second axis and said free end of said one of said third and fourth lever arms;

a cam follower secured to the other end of said rod;

and a stationary circumferential cam positioned coaxially with said turret, said stationary circumferential cam having a cam surface, said cam surface engaging said cam follower and being configured to move said cam follower and said rod to pivot said one of said third and fourth lever arms with respect to the other of said third and fourth lever arms as said turret moves in a rotary pattern.

11. Apparatus according to claim 10 wherein said second pivot axis is coaxial with said pivot axis and wherein the other of said third and fourth lever arms is formed integrally with one of said first and second lever arms.

* * * * *